(12) United States Patent
Nakano et al.

(10) Patent No.: US 6,529,538 B1
(45) Date of Patent: Mar. 4, 2003

(54) GAS LASER OSCILLATOR APPARATUS

(75) Inventors: Masaki Nakano, Hiratsuka (JP); Takayuki Watanabe, Hiratsuka (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 09/184,472

(22) Filed: Nov. 2, 1998

(30) Foreign Application Priority Data

Nov. 18, 1997 (JP) .................................. 9-317382
Feb. 25, 1998 (JP) ................................. 10-043621

(51) Int. Cl.[7] .............................................. H01S 3/097
(52) U.S. Cl. ........................................ 372/87; 372/88
(58) Field of Search .................... 372/86, 87, 88, 372/34

(56) References Cited

U.S. PATENT DOCUMENTS

| | | | | |
|---|---|---|---|---|
| 4,064,465 A | * | 12/1977 | Hundstad | 331/94.5 |
| 4,420,835 A | * | 12/1983 | Hattori et al. | 372/88 |
| 4,611,327 A | * | 9/1986 | Clark et al. | 372/58 |
| 5,247,534 A | * | 9/1993 | Muller-Horsche | 372/58 |
| 5,313,486 A | * | 5/1994 | Nakatani | 372/86 |
| 5,347,531 A | * | 9/1994 | Nakatani et al. | 372/86 |
| 5,818,865 A | * | 10/1998 | Watsun et al. | 372/86 |

* cited by examiner

Primary Examiner—Paul Ip
Assistant Examiner—Jeffrey N Zahn
(74) Attorney, Agent, or Firm—Greer, Burns & Crain, Ltd.

(57) ABSTRACT

An apparatus designed to prevent, by adjusting a flow of laser gas, discharge products from stagnating and being released again into a main discharge space, maintain the purity of the laser gas in the main discharge space, and stabilize the main discharge so as to minimize laser output fluctuation, in which conductors are interposed in the gaps between a main discharge electrode and a pair of corona preliminary ionization electrodes, from the upper surface of a support plate to the discharge starting points.

15 Claims, 11 Drawing Sheets

GAS LASER OSCILLATOR APPARATUS

BACKGROUND OF THE INVENTION

1. Field of the Invention

This invention concerns a discharge-excited gas laser oscillator apparatus that uses preliminary UV ionization induced by corona discharges, and more particularly concerns an improved structure for the corona discharge and main discharge generator unit.

2. Description of the Related Art

The transversely excited atmospheric (TEA) laser performs laser oscillations by a method wherein, in forming the necessary inverted distribution region for laser oscillation, uniform glow discharges are generated in a gas at 1 atmosphere or higher pressure present in a main discharge space configured by a pair of opposing main electrodes. In such a TEA laser, in order to obtain uniform glow discharges throughout the gas in the main discharge space, it is necessary to subject all of the gas in the main discharge space to preliminary ionization prior to the commencement of the main discharges. With an excimer laser, in particular, the electrons in the rare gas used in the main discharges have a short life span, so that an inverse distribution is not formed unless the excitation is performed within that life span. Hence it is necessary to ionize as much of the entirety of the rare gas in the main discharge space as possible immediately prior to main discharge. There are currently a variety of methods used for the preliminary ionization, including X-rays, spark discharges, and corona discharges. Among these methods, however, those employing corona discharges are comparatively simple and contaminate the gas in the main discharge space only slightly, wherefore they are widely employed in capacity-migration preliminary ionization schemes.

In FIG. 11 is diagrammed an excimer laser apparatus which uses conventional corona preliminary ionization electrodes.

This excimer laser apparatus comprises a discharge generation unit equipped with a pair of main discharge electrodes 1 and 2 positioned in mutual opposition, a fan 8 that circulates laser gas G made up of $Kr+Ne+F_2$, etc., in the direction of the arrow, and a heat exchanger 9 that cools the laser gas G.

In the discharge generator unit, a pair of corona preliminary ionization electrodes 12 are provided on the upper surface of a support plate 6, together with one of the main discharge electrodes 1, the corona preliminary ionization electrodes 12 being in opposition across gaps S1 and S2 of width W which extend in the longitudinal direction along either side, respectively, of the main discharge electrode 1. These gaps S1 and S2 are provided for the purpose of reducing the disparity in the distances between the preliminary ionization electrodes 12 and the main discharge electrodes 1 and 2, decreasing the difference between the preliminary ionization intensity in the discharge space in the vicinity of the one main discharge electrode 1 and the preliminary ionization intensity in the discharge space in the vicinity of the other main discharge electrode 2 to provide uniform preliminary ionization in the main discharge space, and thus stabilize the laser output.

The corona preliminary ionization electrodes 12 are configured such that columnar rear electrodes 4, respectively, are provided in the hollow interiors of cylindrical dielectric pipes 3, with the ends of corona electrodes 5 having L-shaped cross sections in contact with the outer surfaces of the dielectric pipes 3.

In such a configuration as this, first, before generating discharges with the main discharge electrodes 1 and 2, high voltages are applied between the rear electrodes 4 and the corona electrodes 5, thereby generating UV light by the corona discharges that are induced at the outer surfaces of the dielectric pipes 3, the starting points 11 thereof being the points of contact between the corona electrodes 5 and the dielectric pipes 3. The laser gas G with which the main discharge space is filled is preliminarily ionized by electrons that are generated by this UV light. Next, when high voltage is applied mutually between the pair of main discharge electrodes 1 and 2, the preliminarily ionized laser gas G exhibits dielectric breakdown, and the main discharge 7 starts. Also, the laser gas G is circulated by the gas flow created by the fan 8, so that the discharge products generated in the main discharge space by the previous discharge are carried away before the next discharge, thereby facilitating pulse oscillations at a high repetition frequency.

With the conventional laser apparatus described above, however, eddies G' of the laser gas G develop in the gaps S1 and S2 existing between the preliminary ionization electrodes 12 and the one main discharge electrode 1, causing metal fluorides, etc., produced by the corona discharges and main discharges, to be stagnated in the gaps S1 and S2. When these discharge products are again released into the main discharge space, the purity of the laser gas G deteriorates, and the main discharges 7 are destabilized, resulting in large fluctuation in laser output, which constitutes a problem.

SUMMARY OF THE INVENTION

With the foregoing in view, an object of the present invention is to provide a gas laser oscillator apparatus wherein laser gas flow is adjusted, thereby preventing discharge products from being stagnated and again released into the main discharge space, maintaining the purity of the laser gas in the discharge space, stabilizing the main discharges, and reducing fluctuation in laser outputs.

A first invention for attaining the object stated above is a gas laser oscillator apparatus comprising:

- a first main discharge electrode and a second main discharge electrode positioned to face with each other;
- a pair of preliminary ionization electrodes comprised of hollow dielectric pipes, rear electrodes placed in hollow interiors of said dielectric pipes, and corona electrodes positioned so as to be in contact with outer surfaces of said dielectric pipes, that are positioned at sides of said first main discharge electrode, among said first and second main discharge electrodes, so as to sandwich said first main discharge electrode therebetween, leaving prescribed gaps between said first main discharge electrode and themselves, respectively; and that generate corona discharges started at points of contact as starting points between said corona electrodes and said dielectric pipes, by application of a high voltage across said corona electrodes and said rear electrodes, so as to produce preliminary ionization in a main discharge space;
- a support plate for securing and supporting said first main discharge electrode and said pair of preliminary ionization electrodes; and
- laser gas that flows from a side of one of said preliminary ionization electrodes toward a side of other of the preliminary ionization electrodes through said main discharge space between said first and second main discharge electrodes;

said corona electrodes being positioned such that the starting points of said corona discharges on the surfaces of said dielectric pipes are lower than a height of a highest part of said first main discharge electrode, wherein:

objects are interposed in said gaps between said first main discharge electrode and said pair of preliminary ionization electrodes, from an upper surface of said support plate to the height of said starting points.

With such a configuration as this, by interposing the objects in the gaps between the first main discharge electrode and the pair of preliminary ionization electrodes, from the upper surface of the support plate to the height of the starting points, the generation of laser gas eddies in the gaps is suppressed, making it possible to prevent the retention in the gaps of discharge products produced by the corona discharges and main discharges.

When this configuration is implemented, there is no release of discharge products back into the laser gas in the main discharge space, and deterioration in laser gas purity can be prevented, wherefore the main discharges can be stabilized, so that, as a result, laser output fluctuation can be decreased.

A second invention is a gas laser oscillator apparatus comprising:

a first main discharge electrode and a second main discharge electrode positioned to face with each other;

a pair of preliminary ionization electrodes that are positioned at sides of said first main discharge electrode, among said first and second main discharge electrodes, so as to sandwich said first main discharge electrode therebetween, leaving prescribed gaps between said first main discharge electrode and themselves, respectively; and a support plate for securing and supporting said first main discharge electrode and said pair of preliminary ionization electrodes; in which laser gas is made to flow from a side of one of said preliminary ionization electrodes toward a side of other of the preliminary ionization electrodes through a main discharge space between said first and second main discharge electrodes, wherein:

a through hole is formed in said first main discharge electrode, connecting one of said gaps with the other of said gaps.

With such a configuration as this, by forming a through hole in the first main discharge electrode so as to connect one of the preliminary ionization electrodes with the other, the laser gas is allowed to pass freely through this through hole, whereby the generation of laser gas eddies in the gaps is suppressed, making it possible to prevent the retention in the gaps of discharge products produced by the corona discharges and main discharges.

When this configuration is implemented, there is no release of discharge products back into the laser gas in the main discharge space, and deterioration in laser gas purity can be prevented, wherefore the main discharges can be stabilized, so that, as a result, laser output fluctuation can be minimized.

A third invention is a gas laser oscillator apparatus comprising:

a first main discharge electrode and a second main discharge electrode positioned to face with each other;

a pair of preliminary ionization electrodes that are positioned at sides of said first main discharge electrode, among said first and second main discharge electrodes, so as to sandwich said first main discharge electrode therebetween, leaving prescribed gaps between said first main discharge electrode and themselves, respectively; and a support plate for securing and supporting said first main discharge electrode and said pair of preliminary ionization electrodes; in which laser gas is made to flow from a side of one of said preliminary ionization electrodes toward a side of other of the preliminary ionization electrodes through a main discharge space between said first and second main discharge electrodes, wherein:

through holes connecting a lower surface and an upper surface of said support plate are formed in said support plate in two regions where said gaps exist.

With such a configuration as this, by forming through holes in the support plate in the two regions where the gaps exist, so as to communicate from the lower surface to the upper surface of the support plate, the laser gas is allowed to pass freely through these through holes, whereby the generation of laser gas eddies in the gaps is suppressed, making it possible to prevent the retention in the gaps of discharge products produced by the corona discharges and main discharges.

When this configuration is implemented, there is no release of discharge products back into the laser gas in the main discharge space, and deterioration in laser gas purity can be prevented, wherefore the main discharges can be stabilized, so that, as a result, laser output fluctuation can be decreased.

A fourth invention is a gas laser oscillator apparatus comprising:

a first main discharge electrode and a second main discharge electrode positioned to face with each other;

a pair of preliminary ionization electrodes that are comprised of hollow dielectric pipes; rear electrodes placed in hollow interiors of said dielectric pipes; and corona electrodes positioned so as to be in contact with outer surfaces of said dielectric pipes, and that are positioned at sides of said first main discharge electrode, among said first and second main discharge electrodes, so as to sandwich said first main discharge electrode therebetween, leaving prescribed gaps between said first main discharge electrode and themselves, respectively; and a support plate for securing and supporting said first main discharge electrode and said pair of preliminary ionization electrodes, in which laser gas is made to flow from a side of one of said preliminary ionization electrodes toward a side of other of said preliminary ionization electrodes through a main discharge space between said first and second main discharge electrodes, wherein:

conductors having heights lower than said first main discharge electrode are interposed in gaps between said first main discharge electrode and said preliminary ionization electrodes on an upper surface of said support plate; and said corona electrodes are positioned relative to said dielectric pipes in a configuration wherein said dielectric pipes press against said conductors, so that said dielectric pipes, respectively, are held sandwiched between said conductors and said corona electrodes.

With such a configuration as this, by interposing conductors having heights lower than the first main discharge electrode in the gaps between the first main discharge electrode and the preliminary ionization electrodes, the generation of laser gas eddies in the gaps is suppressed, making it possible to prevent the retention in the gaps of discharge products produced by the corona discharges and main discharges.

When this configuration is implemented, there is no release of discharge products back into the laser gas in the main discharge space, and deterioration in laser gas purity can be prevented, wherefore the main discharges can be stabilized, so that, as a result, laser output fluctuation can be decreased.

If, moreover, the conductors and the corona electrodes are made to be in area contact with the outer surfaces of the dielectric pipes in a configuration wherein they cover the outer side surfaces of the dielectric pipes, respectively, almost all superfluously emitted light that does not contribute to laser oscillation is eliminated at the corona preliminary ionization electrodes, and almost the entire quantity of light emitted from the corona preliminary ionization electrodes is directed toward the main discharge space, wherefore it becomes possible to sharply improve laser oscillation efficiency.

DESCRIPTION OF THE PREFERRED EMBODIMENTS

Embodiments of the present invention are now described with reference to the drawings.

Figure 1:
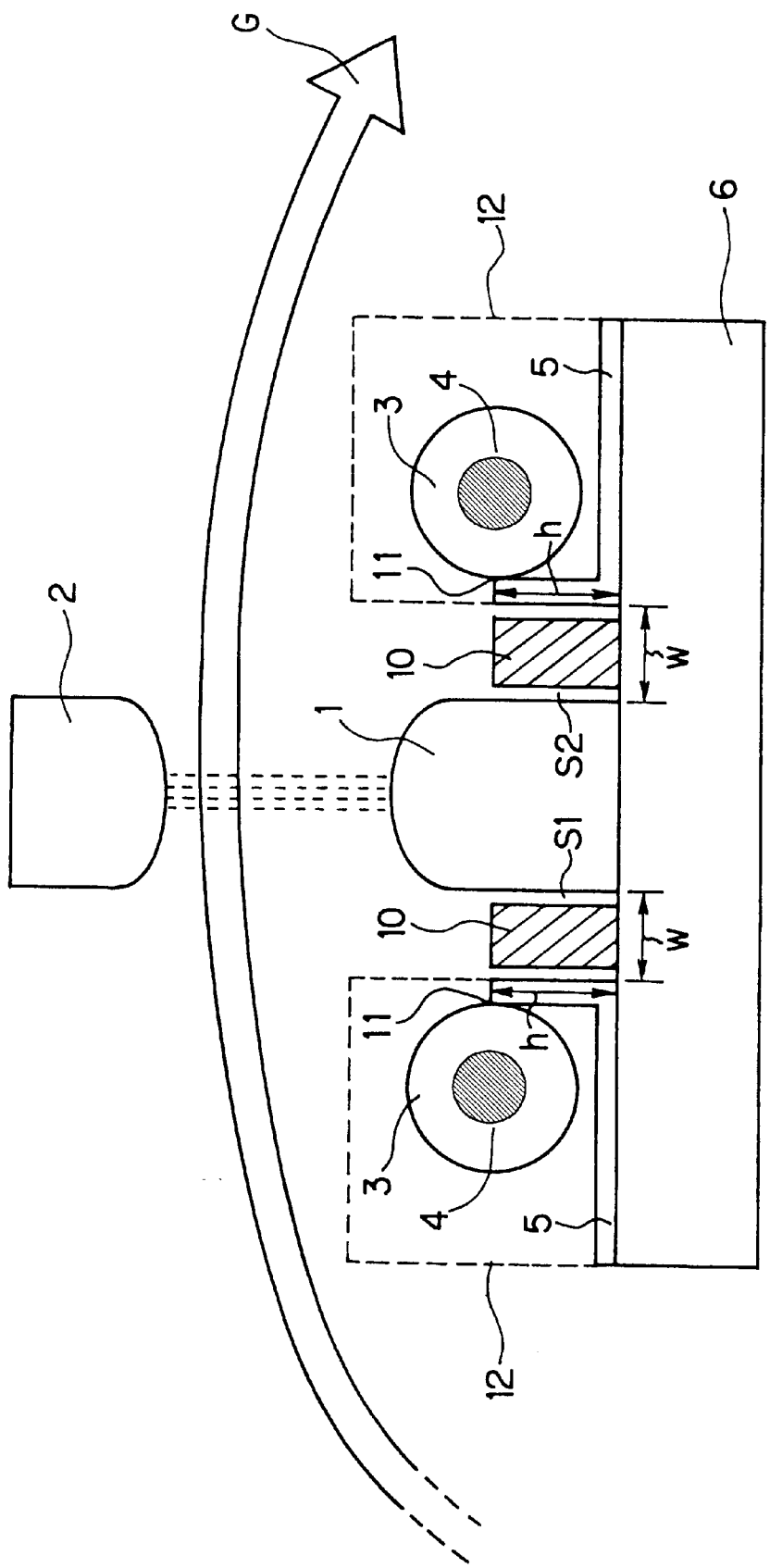
FIG. 1 is a diagram of a first embodiment in the present invention.

In FIG. 1 is diagrammed a first embodiment of the present invention.

Figure 11:
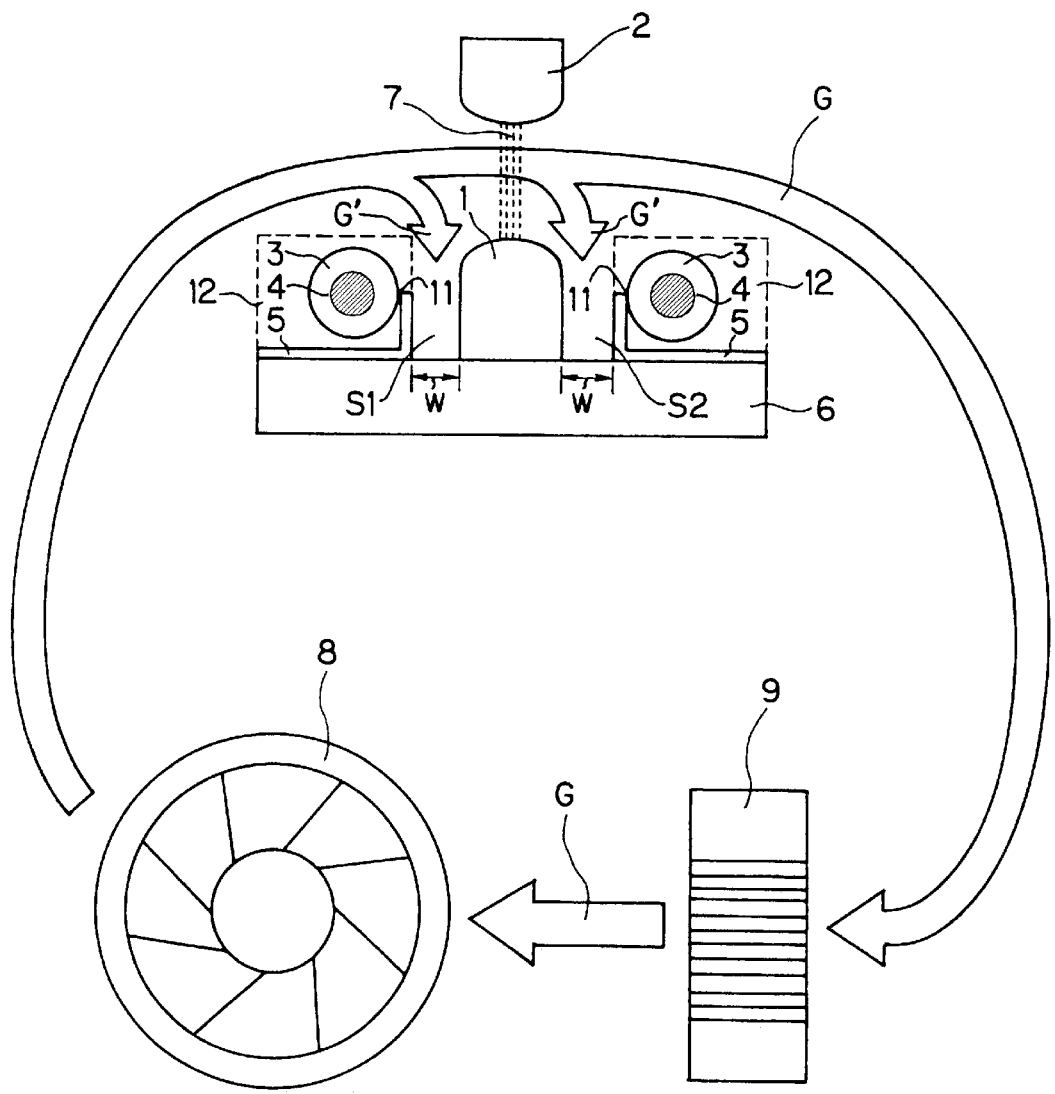
FIG. 11 is a diagram of a prior art apparatus.

This embodiment is similar to the prior art diagrammed in FIG. 11, as discussed above, in two respects, namely (1) in that a pair of main discharge electrodes 1 and 2 are placed in opposition, and a pair of corona preliminary ionization electrodes 12 are positioned together with the main discharge electrode 1 on a support plate 6, with the corona preliminary ionization electrodes 12 positioned in opposition so as to secure gaps S1 and S2 of width W that extend along the sides of the main discharge electrode 1, in the longitudinal direction thereof, and (2) in that the corona preliminary ionization electrodes 12 are such that columnar rear electrodes 4 are placed in the hollow interiors of cylindrical dielectric pipes 3 and that the outer surfaces of the dielectric pipes 3 are in contact with the ends of corona electrodes 5 having L-shaped cross-sections. Laser gas G is circulated by means of the fan 8 indicated in FIG. 11 so that it flows along the path indicated by the arrow.

In this first embodiment, conductors 10 are interposed in the gaps S1 and S2, respectively, that are maintained between the main discharge electrode 1 and the corona preliminary ionization electrodes 12. In determining the height h of the conductors 1, in order not to block the radiation into the main discharge space of the UV light generated from starting points 11 that are the points of contact between the dielectric pipes 3 and the corona electrodes 5, the height h is set so that at maximum it will be no higher than the starting points 11.

In the apparatus in this embodiment, furthermore, the positions wherein the corona preliminary ionization electrodes 12 are located, in the height dimension, are made such that the highest parts thereof are lower than the height of the top of the main discharge electrode 1, so that the flow of laser gas is not disturbed by the corona preliminary ionization electrodes 12.

In the positional relationship between the main discharge electrode 1 and the corona preliminary ionization electrodes 12, wherein laser gas flow has been taken into consideration, it is necessary to radiate the UV light generated from the starting points 11 at the points of contact between the dielectric pipes 3 and corona electrodes 5. Therefore the positions of the starting points 11 are made lower than the highest point of the main discharge electrode 1.

As based on this first embodiment, the conductors 10 are interposed in the spaces in the gaps S1 and S2 from the upper surface of the support plate 6 to the starting points 11, wherefore, the occurrence of laser gas eddies in the gaps S1 and S2 can be suppressed in a state wherein the difference between the preliminary ionization intensity in the discharge space in the vicinity of the one main discharge electrode 1 and the preliminary ionization intensity in the discharge space in the vicinity of the other main discharge electrode 2 is made small, thus effecting uniform preliminary ionization in the main discharge space, wherefore the retention in the gaps S1 and S2 of discharge products generated by the corona discharges and main discharges can be prevented. Hence discharge products are no longer released back into the laser gas in the main discharge space, deterioration in laser gas purity can be prevented, and the main discharges can be stabilized. As a result, it is possible to reduce laser output fluctuation. Also, because it is therewith possible to realize uniform gas flows in the main discharge space, it is also possible to achieve high-repetition pulse action.

Instead of the conductors 10 described above, it is permissible to employ insulators as the objects interposed in the gaps S1 and S2.

Figure 2:
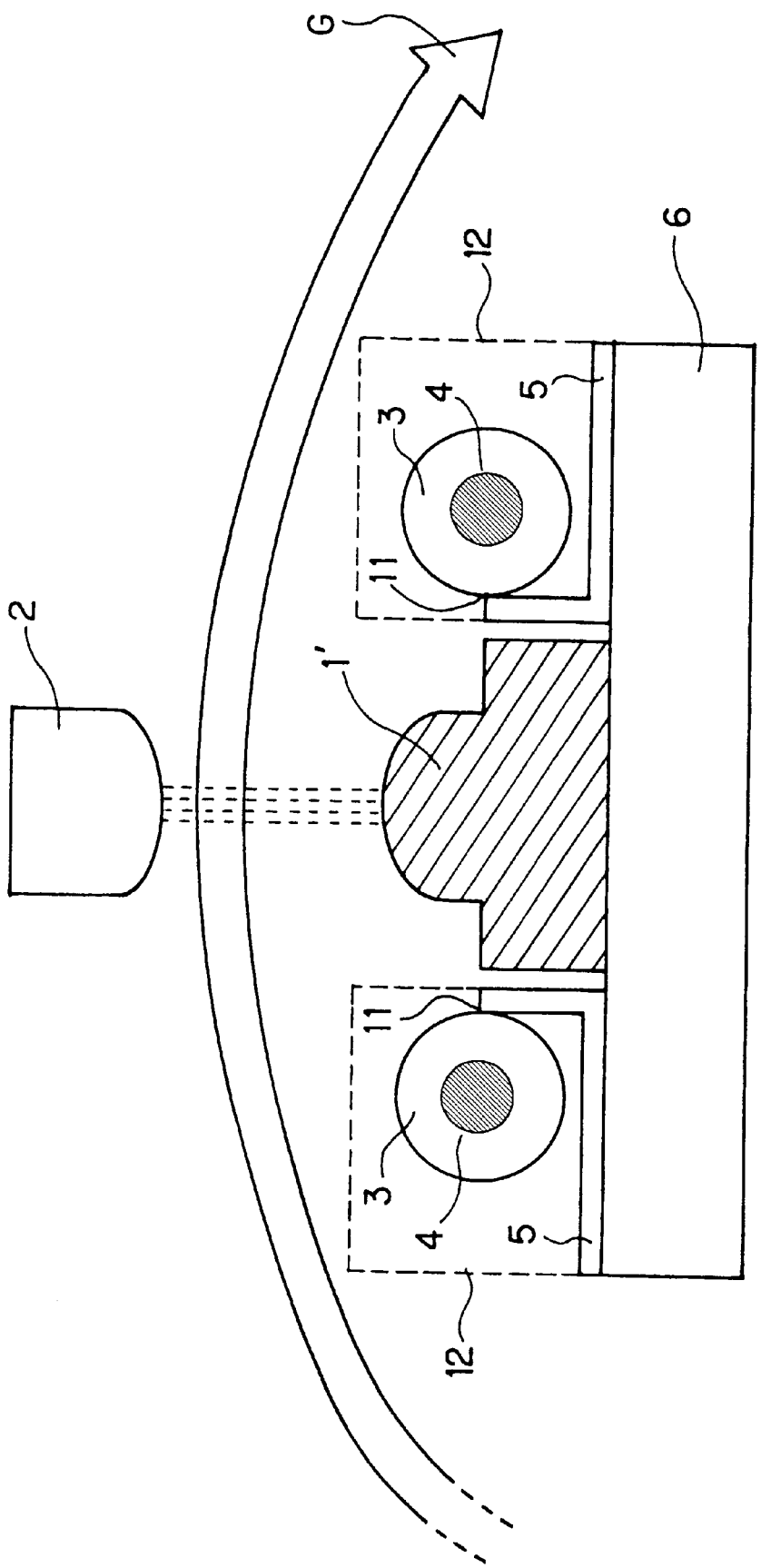
FIG. 2 is a diagram of a second embodiment in the present invention.

A second embodiment of the present invention is diagrammed in FIG. 2, wherein the same configurational elements as in FIG. 1 are identified by the same reference characters.

In the embodiment diagrammed in FIG. 2, the conductors 10 and the main discharge electrode 1 described in the previous embodiment are integrated to configure a main discharge electrode 1', thereby facilitating a reduction in the number of components. It is also permissible, when connecting both the main discharge electrode 1 and the corona electrodes 5 on the grounded side, to implement a structure wherein the main discharge electrode 1' and corona electrodes 5 are also integrated.

Figure 3A:
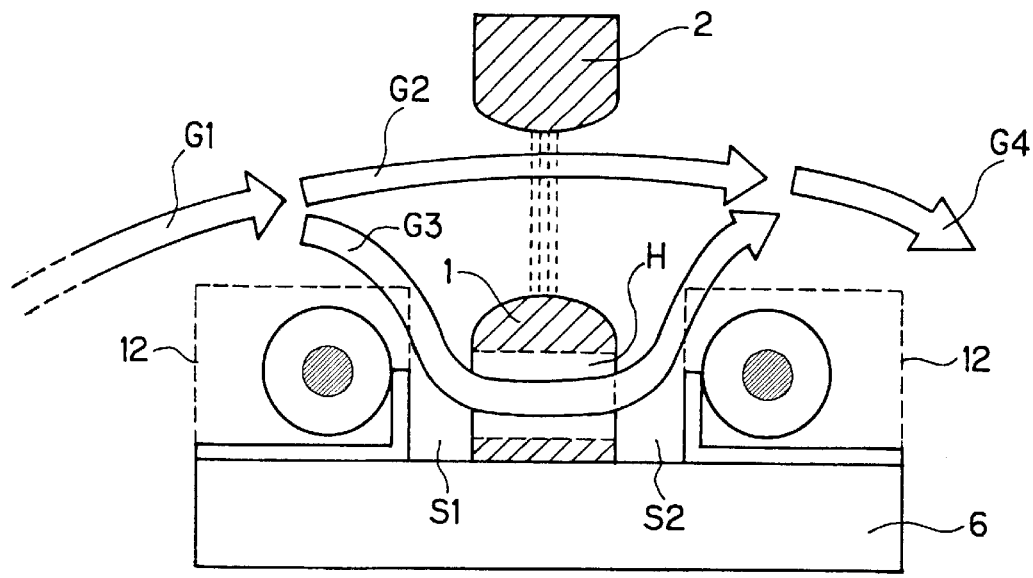
FIGS. 3(a) and 3(b) are diagrams of a third embodiment in the present invention.
Figure 3B:
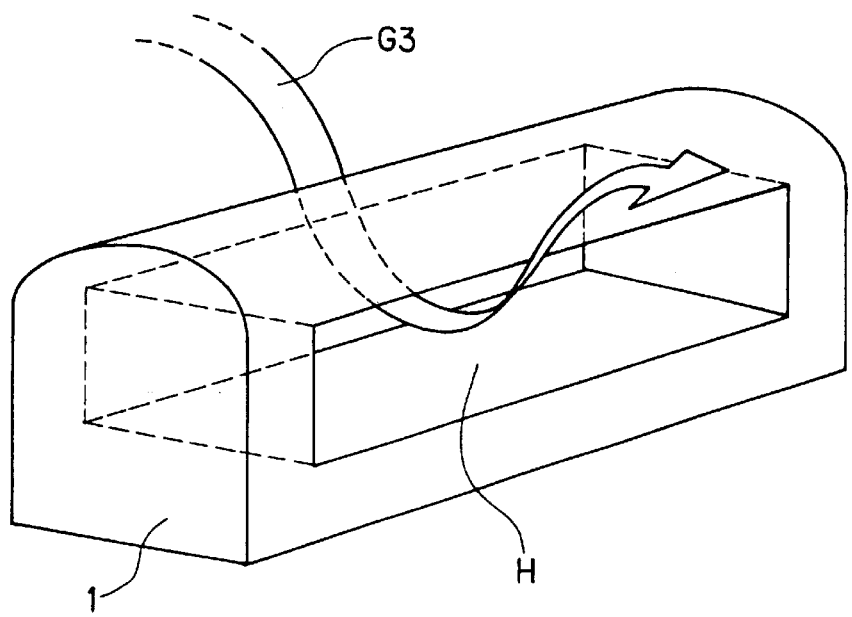

In FIG. 3(a) and FIG. 3(b) are diagrammed a third embodiment of the present invention. Here again, the same configurational elements as in FIG. 1 are identified by the same reference characters.

In this third embodiment, the main discharge electrode 1 is made with a through hole H formed therein connecting between the two gaps S1 and S2.

When this is done, the long sides of the through hole H are each formed as a single rectangular parallelopiped extending in the longitudinal dimension of the main discharge electrode 1.

Configured in this manner, when a gas flow is induced by the fan, circulating the laser gas to generate repeating pulse oscillations, the laser gas G1 that comes flowing into the discharge generator unit branches into G2 that flows through the main discharge space and G3 that flows into the gaps S1 and S2. When the laser gas G3 flows into the gap S1, it passes through the through hole H formed in the main discharge electrode 1 and flows out into the gap S2. The laser gas G3 and the laser gas G2 then converge again and flow out from the discharge generator unit as the laser gas G4.

As based on this third embodiment, because the through hole H connecting between the gaps S1 and S2 is formed in the main discharge electrode 1, the development of laser gas eddies in the gaps S1 and S2 can be suppressed. Also, since the laser gas G3 flows from the gap S1 through the through hole H to the gap S2, it is possible to prevent the retention of discharge products produced by the corona discharges and main discharges in the gaps S1 and S2. Thus the release of discharge products back into the laser gas in the main discharge space is eliminated, laser gas purity degradation can be prevented, and the main discharges can be stabilized, wherefore, as a result, it is possible to reduce laser output fluctuation. And, because uniform gas flows can be realized in the main discharge space, high-repetition pulse action becomes possible.

Figure 4A:
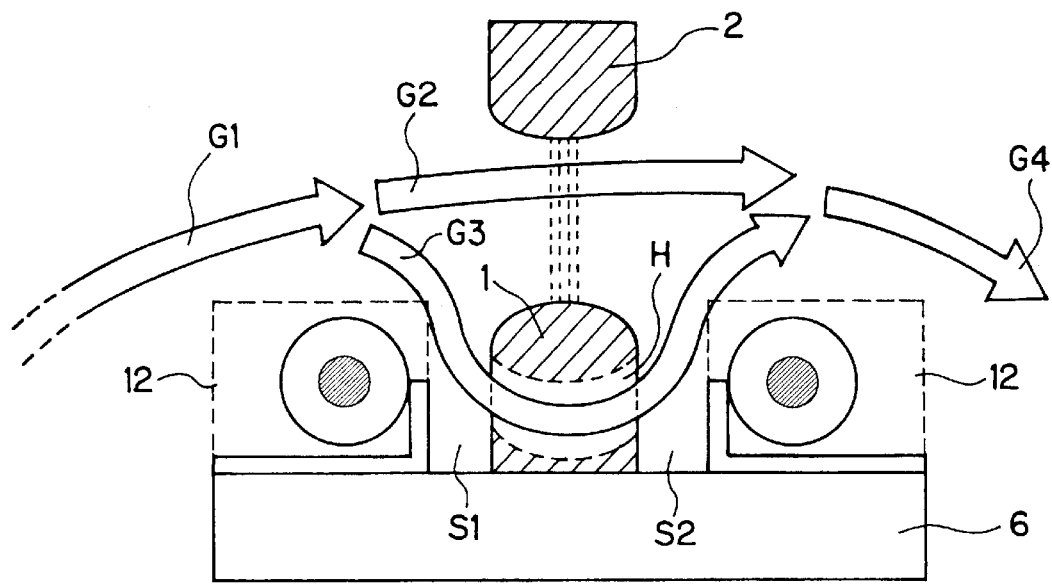
FIGS. 4(a) and 4(b) are diagrams of a fourth embodiment in the present invention.
Figure 4B:
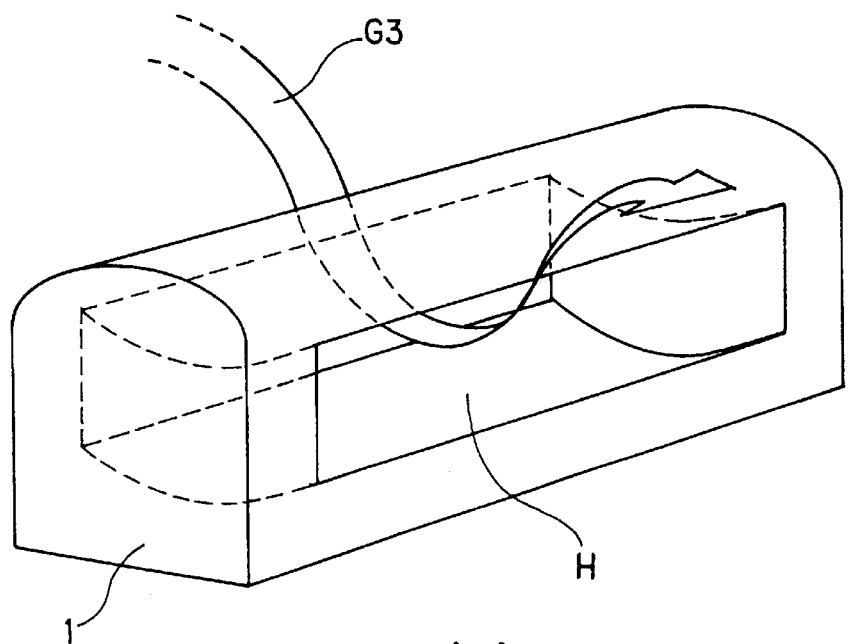

A fourth embodiment of the present invention is diagrammed in FIG. 4(a) and FIG. 4(b). Here again, the same configurational elements as in FIG. 1 are identified by the same reference characters.

In this fourth embodiment, the through hole H is formed in the main discharge electrode 1 so as to provide a U-shaped path.

As based on this fourth embodiment, by imparting a U shape to the through hole H, the position of the middle part of the path in the through hole H is lowered farther than the positions of the two openings in the through hole H, in the opposite direction from the discharge surface of the main discharge electrode 1, thereby making it easier for the laser gas G3 to pass through than when the path inside the through hole H connecting between the gaps S1 and S2 is made linear.

Figure 5A:
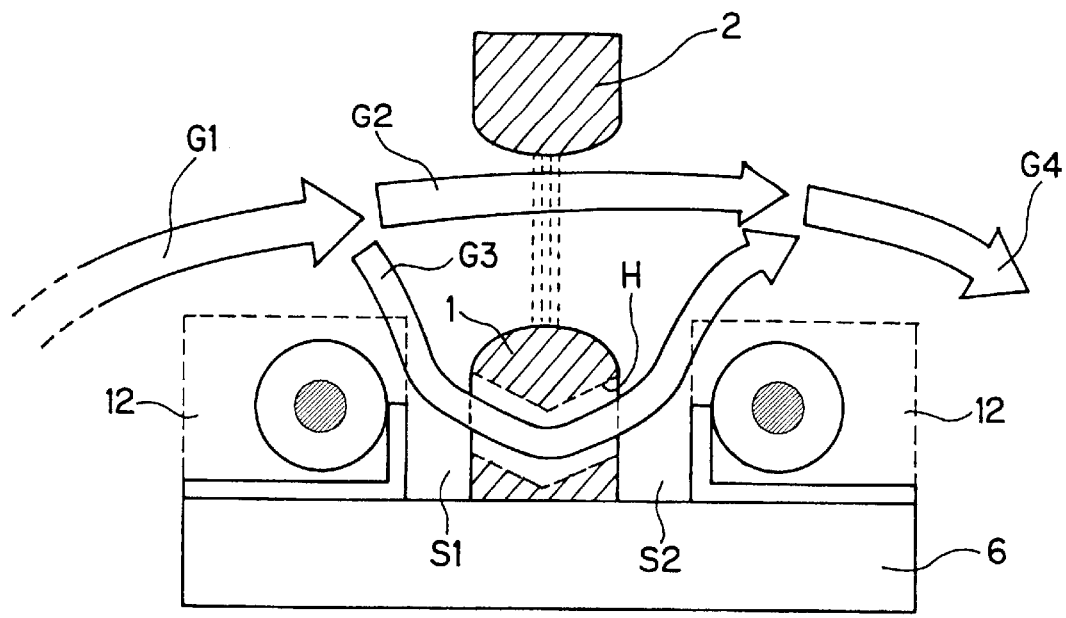
FIGS. 5(a) and 5(b) are diagrams of a fifth embodiment in the present invention.
Figure 5B:
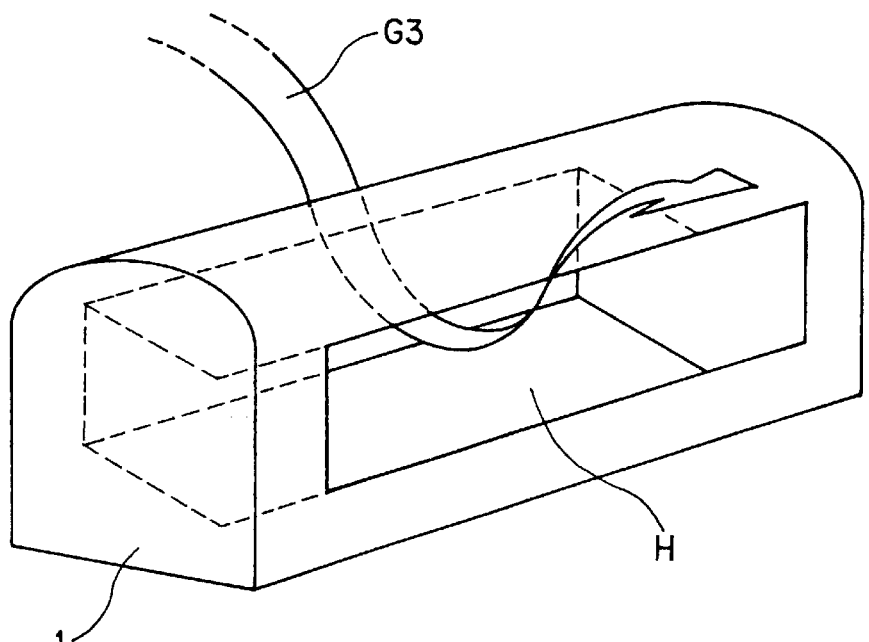

A fifth embodiment of the present invention is diagrammed in FIG. 5(a) and FIG. 5(b). Here again, the same configurational elements as in FIG. 1 are identified by the same reference characters.

In this fifth embodiment, the through hole H is formed in the main discharge electrode 1 so that its path has a V shape.

As based on this fifth embodiment, the path in the through hole H is formed so that it has a V shape, wherefore it is made easier for the laser gas G3 to flow out through the through hole H that connects between the gaps S1 and S2 than when the shape of that through hole H is made linear. It is also easier to do the machining on the main discharge electrode 1 when forming the through hole H therein than when the path shape is made U-shaped.

Figure 6A:
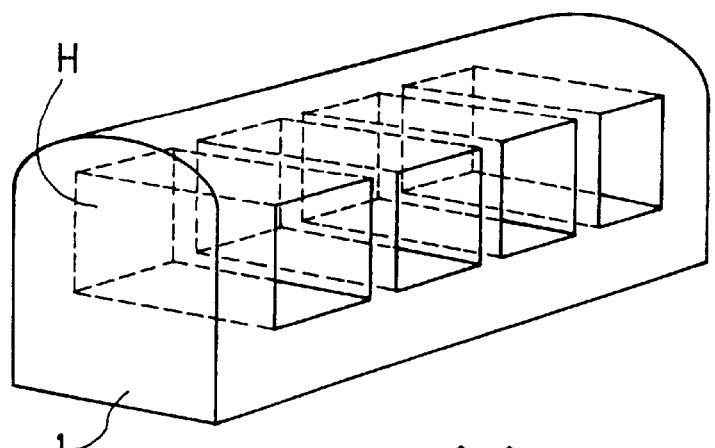
FIGS. 6(a) to 6(c) are diagrams of a sixth embodiment in the present invention.
Figure 6B:
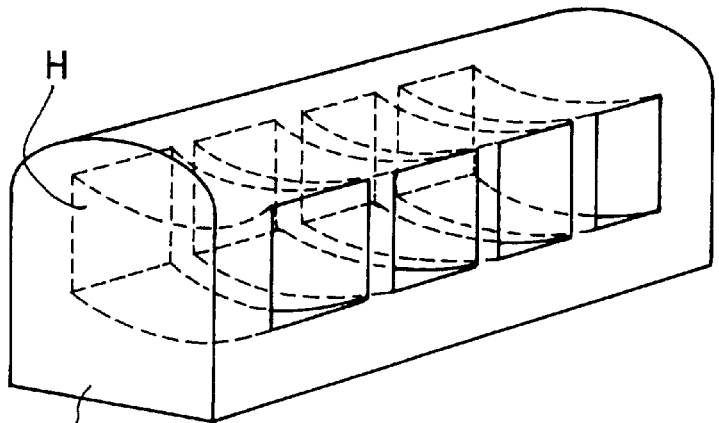
Figure 6C:
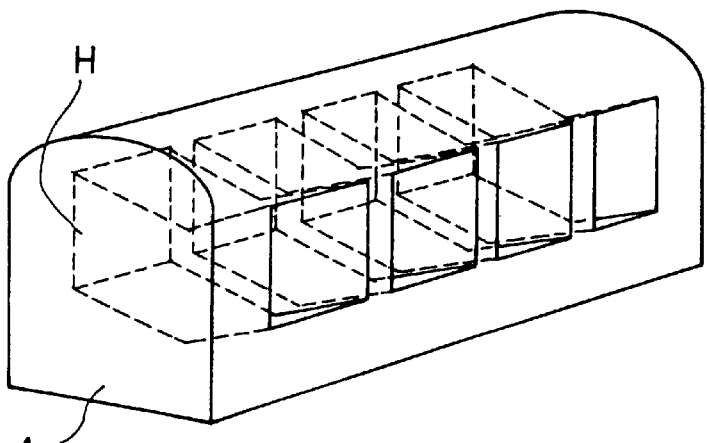

A sixth embodiment is diagrammed in FIG. 6(a), FIG. 6(b), and FIG. 6(c).

In this sixth embodiment, each of the through holes H having the various path shapes indicated in the foregoing embodiments has been formed as a plurality of holes that are lined up in the longitudinal dimension of the main discharge electrode 1.

When this sixth embodiment is implemented, it becomes possible to enhance the strength of the main discharge electrode 1 by providing multiple through holes H in a row extending in the longitudinal dimension of the main discharge electrode 1.

If the through holes H are given columnar shapes, moreover, it becomes easier to machine them.

Figure 7A:
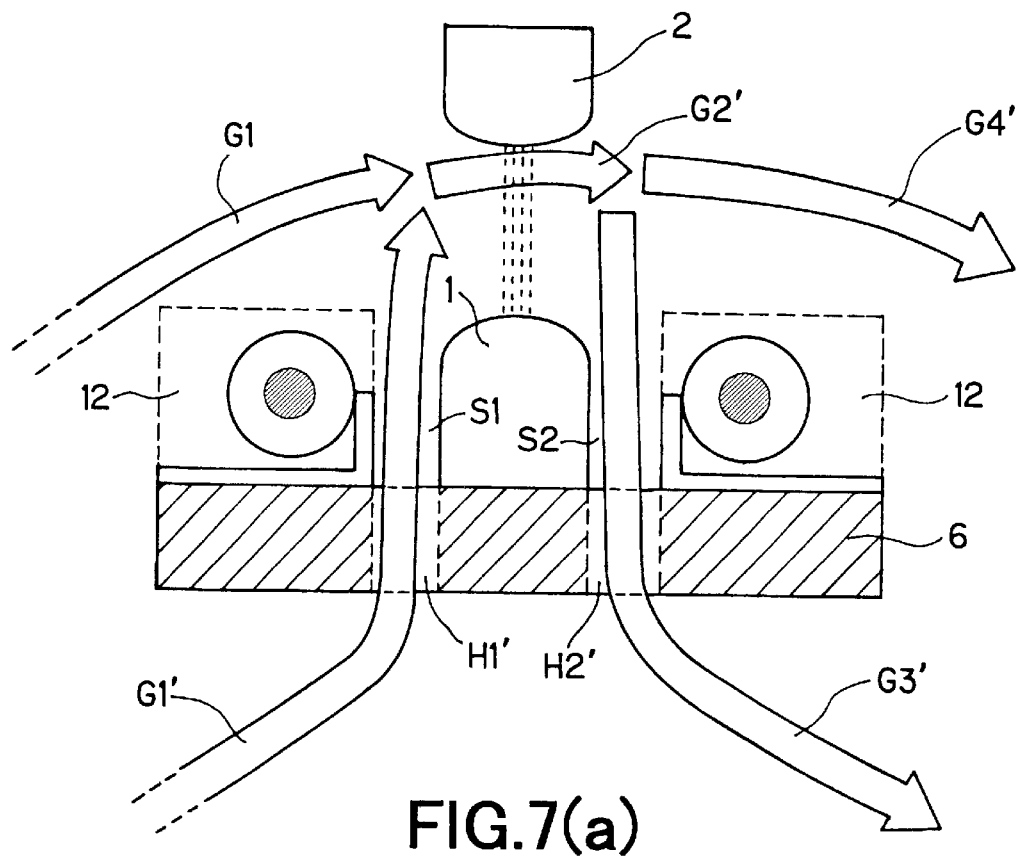
FIGS. 7(a) and 7(b) are diagrams of a seventh embodiment in the present invention.
Figure 7B:
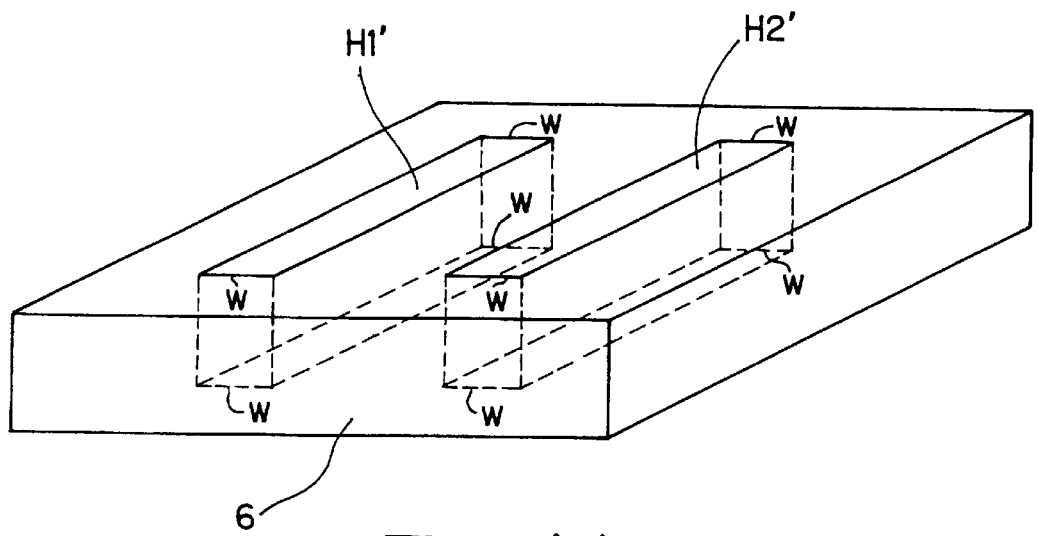

A seventh embodiment of the present invention is diagrammed in FIG. 7. Here again, the same configurational elements as in FIG. 1 are identified by the same reference characters.

In this seventh embodiment, through holes H1' and H2' are formed in the two regions in the support plate 6 where the gaps S1 and S2 exist, connecting between the lower surface and the upper surface of the support plate 6.

Here the through holes H1' and H2' are formed as rectangular parallelopipeds the long sides of which extend in the longitudinal dimension of the main discharge electrode 1.

With this configuration, when the laser gas is circulated, the laser gas that flows into the discharge generator unit branches into G1 that flows to the main discharge space and G1' that flows into the gap S1 through the through hole H1' formed in the support plate 6. However, these gas flows again converge in the main discharge space, only to branch again into G4' that flows out from the discharge generator unit and G3' that flows by way of the gap S2 through the through hole H2' formed in the support plate 6 and out from the discharge generator unit.

Accordingly, as based on this seventh embodiment, while suppressing the generation of laser gas eddies in the gaps S1 and S2, it is also possible to prevent the retention in the gaps S1 and S2 of the discharge products produced by the corona discharges and main discharges. That being so, the discharge products no longer are released back into the laser gas in the main discharge space, laser gas purity degradation can be prevented, and the main discharges can be stabilized. As a result, laser output fluctuation can be diminished. It is also possible to realize uniform gas flows in the main discharge space, thereby facilitating high-repetition pulse action.

Furthermore, by making the widths of the through holes H1' and H2' the same as the width W of the gaps S1 and S2, it is possible to prevent dust and grime from collecting in the vicinity of the openings in the through holes H1' and H2' in the upper surface of the support plate 6.

Figure 8A:
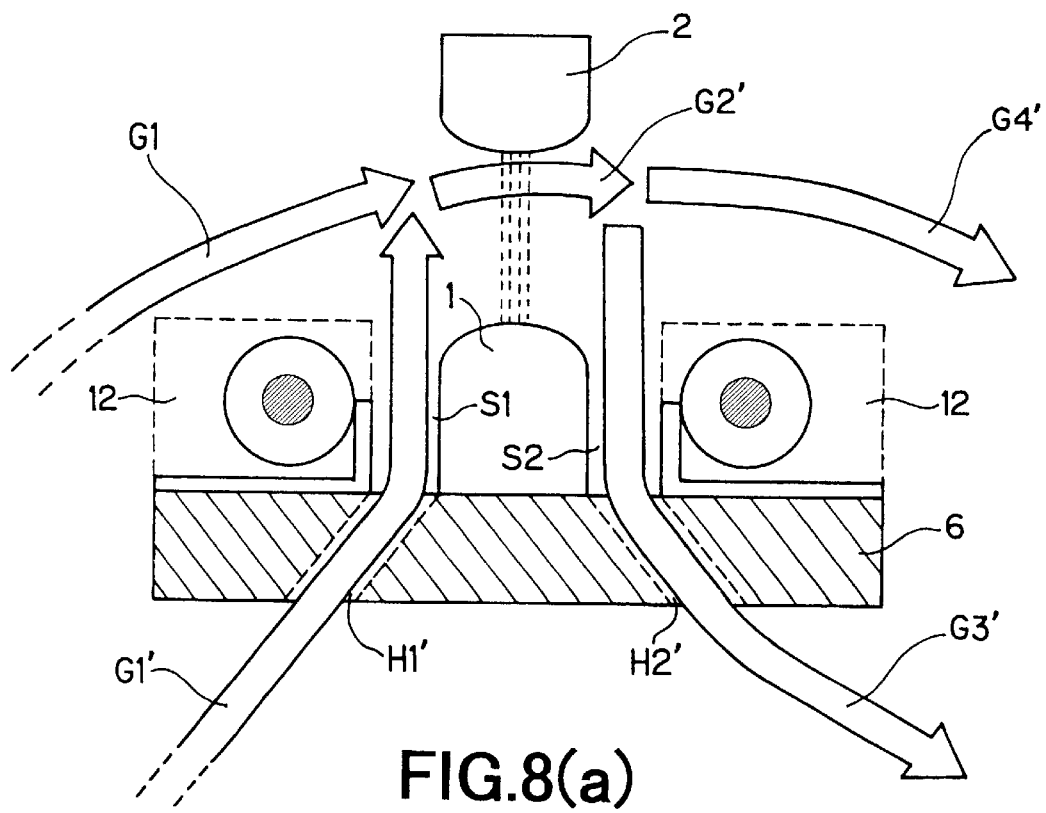
FIGS. 8(a) and 8(b) are diagrams of a eighth embodiment in the present invention.
Figure 8B:
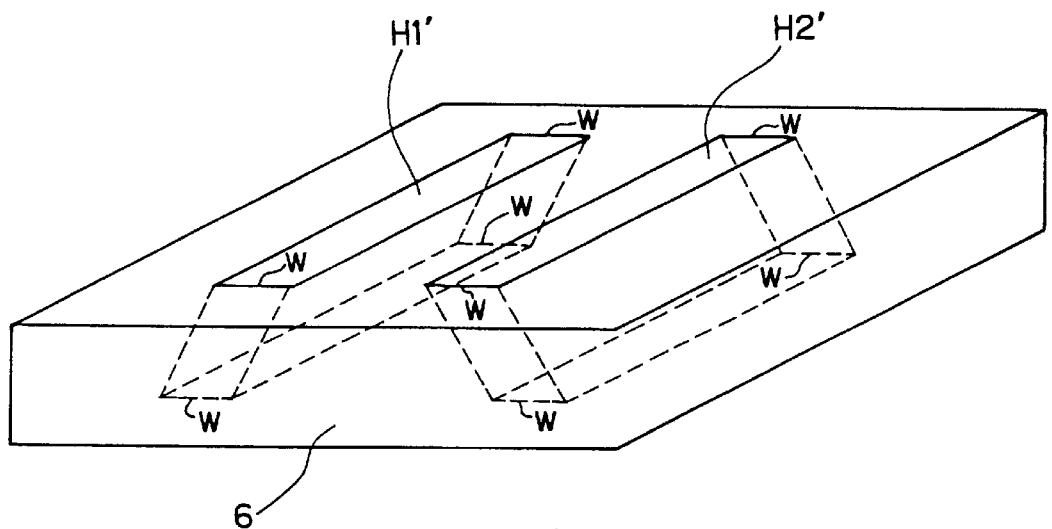

An eighth embodiment of the present invention is diagrammed in FIG. 8. Here again, the same configurational elements as in FIG. 1 are identified by the same reference characters.

In this eighth embodiment, the positions of the openings of the through holes H1' and H2' at the lower surface of the support plate 6 are spread farther away from the main discharge electrode 1 than the positions of the openings thereof at the upper surface of the support plate 6.

As based on this eighth embodiment, the through holes H1' and H2' are formed in directions that are along the flow of the laser gas, wherefore it is made easier for the laser gas flows G1' and G3' to pass through the through holes H1' and H2' than when those through holes H1' and H2' are formed as rectangular parallelepipeds.

Figure 9A:
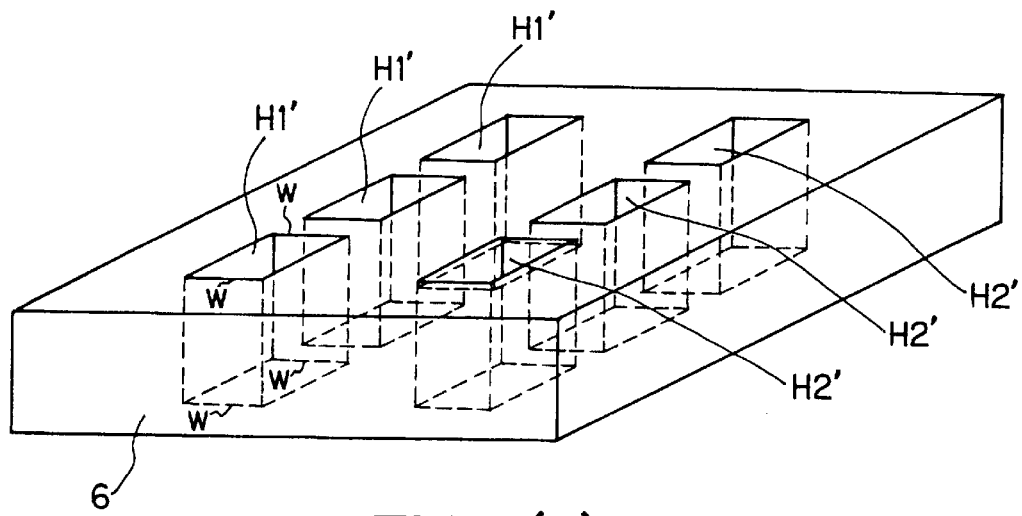
FIGS. 9(a) and 9(b) are diagrams of a ninth embodiment in the present invention.
Figure 9B:
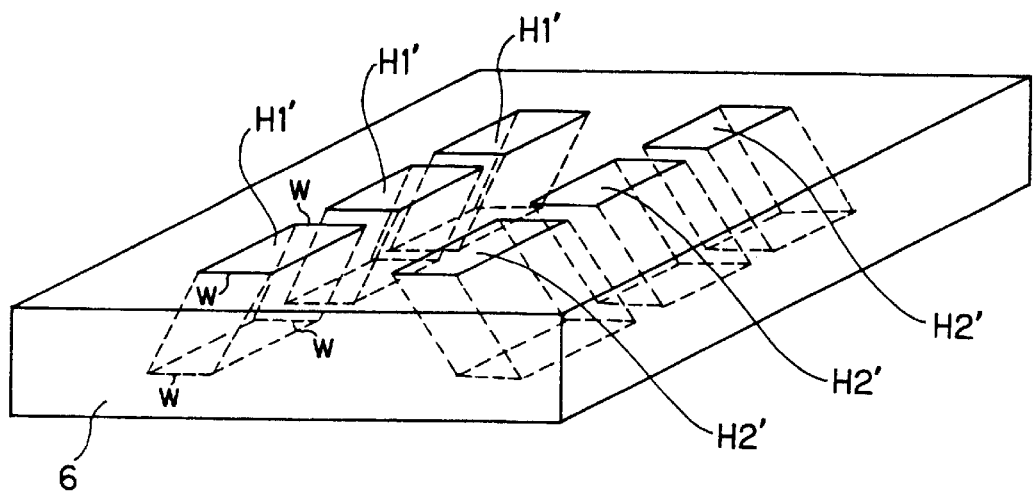

A ninth embodiment of the present invention is diagrammed in FIG. 9(a) and FIG. 9(b).

In this ninth embodiment, the through holes H1' and H2' having paths shaped as indicated in the embodiments diagrammed in FIG. 7 and 8, as noted above, are formed in plural numbers along the longitudinal dimension of the main discharge electrode 1, thereby making it possible to improve the strength of the support plate 6 over that of the previous embodiments.

Here again, machining is made easier if the through holes H are given columnar shapes.

Figure 10:
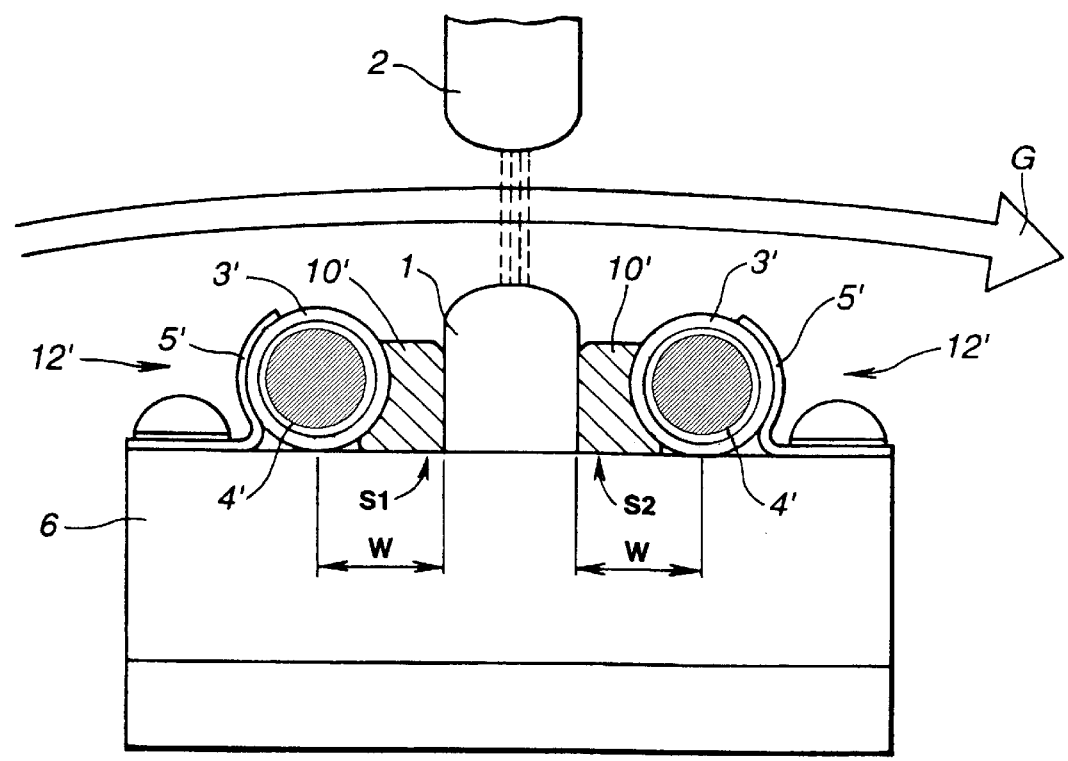
FIG. 10 is a diagram of a tenth embodiment in the present invention.

A tenth embodiment of the present invention is diagrammed in FIG. 10.

This embodiment is the same as the earlier embodiments insofar as a pair of main discharge electrodes 1 and 2 are set in opposition, insofar as a pair of corona preliminary ionization electrodes 12' that oppose each other while maintaining gaps S1 and S2 of width W is provided so as to extend along the sides of the one main discharge electrode 1, in the longitudinal direction thereof, and insofar as laser gas G flows along the path indicated by the arrow. This embodiment differs from the earlier embodiments, however, in the configurational details of the corona preliminary ionization electrodes 12'.

Specifically, the corona preliminary ionization electrodes 12' employed in this tenth embodiment comprise hollow dielectric pipes 3', rear electrodes 4' provided in the hollow interiors of the dielectric pipes 3', corona electrodes 5' the base end parts of which extend, on the upper surface of the support plate 6, from the outside toward one of the main discharge electrodes 1, the center parts of which are bent upwards, and the terminal ends of which are curved along the outer surfaces of the dielectric pipes 3' on the sides thereof farthest away from each other.

The corona electrodes 5' are formed of a very elastic material. They are attached to the upper surface of the support plate 6 through the base end parts, with the terminal end parts in area contact with the outer surfaces of the dielectric pipes 3', so that the elasticity thereof acts to push the two dielectric pipes 3' toward the one main discharge electrode 1. Here, if the corona electrodes 5' are elastic bodies, it is possible to have the corona electrodes 5' and the dielectric pipes 3' mutually contacting each other, without any gap therebetween, throughout the longitudinal dimension of the dielectric pipes 3'. Thus there is no danger of damage being done to the dielectric pipes 3' which exhibit almost no elasticity.

In this tenth embodiment, furthermore, conductors 10' have been interposed in the gaps S1 and S2, respectively, maintained between the main discharge electrode 1 and the corona preliminary ionization electrodes 12'. The conductors 10' are configured such that the height thereof above the upper surface of the support plate 6 is lower than that of the main discharge electrode 1, so the surfaces that face the main discharge electrode 1 are flat surfaces, wherefore they are in contact with the main discharge electrode 1 through the flat surfaces, while the surfaces that face the corona preliminary ionization electrodes 12' exhibit a circular arced concave shape that matches the outer surfaces of the dielectric pipes 3'. The conductors 10' are in area contact, through the circular arced concave surfaces thereof, with the outer surfaces of the two dielectric pipes 3' on the sides facing each other. These conductors 10' function to fill in the gaps S1 and S2, described above, on the upper surface of the support plate 6, while also functioning to press against the dielectric pipes 3' so as to hold them sandwiched in place between the conductors 10' and the corona electrodes 5'.

In the apparatus of this embodiment also, the placement positions in the height direction of the corona preliminary ionization electrodes 12' are such that the highest points thereof are at or below the height of the highest point of the main discharge electrode 1, so that the flow of the laser gas G is not disturbed by the corona preliminary ionization electrodes 12'.

As based on this tenth embodiment, the gaps S1 and S2 maintained on the upper surface of the support plate 6 are filled in by the conductors 10', whereby the development of laser gas G eddies in the gaps S1 and S2 can be suppressed, and the retention in the gaps S1 and S2 of the discharge products produced by the corona electrodes and the main electrodes can be prevented. Thus the discharge products are no longer released back into the laser gas G in the main discharge space, laser gas G purity degradation can be prevented, and the main discharges can be stabilized, as a result of which laser output fluctuation can be diminished. Also, it is possible to realize uniform laser gas G flows in the main discharge space, thereby facilitating high-repetition pulse action.

With this tenth embodiment, furthermore, the portions of the outer surfaces of the dielectric pipes 3' that face each other are covered by the conductors 10', while the portions thereof on the far opposite sides are covered by the corona electrodes 5', wherefore superfluous emitted light that does not contribute to laser oscillation is almost completely eliminated in the corona preliminary ionization electrodes 12'. As a consequence, almost the entire volume of emitted light coming from the corona preliminary ionization electrodes 12' is directed toward the main discharge space, making it possible to sharply improve laser oscillation efficiency.

Also, the corona preliminary ionization electrodes are not limited to a single pair in the embodiments described in the foregoing but may be a plurality of pairs.

As described in the embodiments set forth in the foregoing, moreover, the present invention is applied to an excimer laser, but the present invention may be applied to any gas laser so long as preliminary ionization is performed.

What is claimed is:

1. A gas laser oscillator apparatus comprising:
    a first main discharge electrode and a second main discharge electrode positioned to face with each other;
    a pair of preliminary ionization electrodes comprised of hollow dielectric pipes, rear electrodes placed in hollow interiors of said dielectric pipes, and corona electrodes positioned so as to be in contact with outer surfaces of said dielectric pipes, that are positioned at sides of said first main discharge electrode, among said first and second main discharge electrodes, so as to sandwich said first main discharge electrode therebetween, leaving prescribed gaps between said first main discharge electrode and themselves, respectively, and that generate corona discharges started at points of contact as starting points between said corona electrodes and said dielectric pipes, by application of a high voltage across said corona electrodes and said rear electrodes, so as to produce preliminary ionization in a main discharge space;
    a support plate for securing and supporting said first main discharge electrode and said pair of preliminary ionization electrodes; and laser gas that flows from a side of one of said preliminary ionization electrodes toward a side of other of the preliminary ionization electrodes through said main discharge space between said first and second main discharge electrodes;

said corona electrodes being positioned such that the starting points of said corona discharges on the surfaces of said dielectric pipes are lower than a height of a highest part of said first main discharge electrode, wherein the improvement comprises:

portions of the corona electrodes being in contact with the dielectric pipes are formed into a plate-shape with a thickness thinner than the main discharge electrode in directions facing to the dielectric pipes; and objects are disposed in said gaps between said first main discharge electrode and said plate-shaped contact portions of the corona electrodes, from an upper surface of said support plate to the height of said starting points, for reducing an eddy of the laser gas in said gaps.

2. The gas laser oscillator apparatus according to claim 1, wherein said objects are conductors.

3. The gas laser oscillator apparatus according to claim 2, wherein said conductors and said first main discharge electrode are integrated into a single structure.

4. A gas laser oscillator apparatus comprising:

a first main discharge electrode and a second main discharge electrode positioned to face with each other;

a pair of preliminary ionization electrodes that are positioned at sides of said first main discharge electrode, among said first and second main discharge electrodes, so as to sandwich said first main discharge electrode therebetween, leaving prescribed gaps between said first main discharge electrode and themselves, respectively; and a support plate for securing and supporting said first main discharge electrode and said pair of preliminary ionization electrodes, in which laser gas is made to flow from a side of one of said preliminary ionization electrodes toward a side of other of the preliminary ionization electrodes through a main discharge space between said first and second main discharge electrodes, wherein the improvement comprises:

a through hole formed in said first main discharge electrode so that the laser gas is descended from one of the preliminary ionization electrodes towards the gap maintained on the side of said one of the preliminary ionization electrodes, passed from the gap maintained on the side of said one of the preliminary ionization electrodes through the first main discharge electrode to the gap maintained on the side of the other one of the preliminary ionization electrodes, and ascended from the gap maintained on the side of the other one of said preliminary ionization electrodes towards the other one of said preliminary ionization electrodes, to thereby reduce an eddy of the laser gas in said gaps.

5. The gas laser oscillator apparatus according to claim 4, wherein a position of a center part of a path of said through hole is made to descend lower than positions of both openings of said through hole, in an opposite direction from a discharge surface of said first main discharge electrode.

6. The gas laser oscillator apparatus according to claim 5, wherein said path of said through hole is made in a U shape.

7. The gas laser oscillator apparatus according to claim 5, wherein said path of said through hole is made in a V shape.

8. The gas laser oscillator apparatus according to claim 4, wherein said through hole is a single hole formed integrally in said first main discharge electrode, extending in a longitudinal direction thereof.

9. The gas laser oscillator apparatus according to claim 4, wherein said through hole is implemented by a plurality of holes lined up in a longitudinal direction of said first main discharge electrode.

10. A gas laser oscillator apparatus comprising:

a first main discharge electrode and a second main discharge electrode positioned to face with each other;

a pair of preliminary ionization electrodes that are positioned at sides of said first main discharge electrode, among said first and second main discharge electrodes, so as to sandwich said first main discharge electrode therebetween, leaving prescribed gaps between said first main discharge electrode and themselves, respectively; and a support plate for securing and supporting said first main discharge electrode and said pair of preliminary ionization electrodes, in which laser gas is made to flow from a side of one of said preliminary ionization electrodes toward a side of other of the preliminary ionization electrodes through a main discharge space between said first and second main discharge electrodes, wherein the improvement comprises:

through holes formed in the support plate so that the laser gas is ascended from a lower side of one of said preliminary ionization electrodes through said support plate and the gap maintained on the side of said one of the preliminary ionization electrodes towards said main discharge space and descended from said main discharge space through the gap maintained on the side of the other one of said preliminary ionization electrodes and said support plate towards a lower side of the other one of said preliminary ionization electrodes, to thereby reduce an eddy of the laser gas in said gaps.

11. The gas laser oscillator apparatus according to claim 10, wherein the positions of the openings of said through holes at the lower surface of said support plate are spread farther away from said first main discharge electrode than the positions of the openings thereof at the upper surface of said support plate.

12. The gas laser oscillator apparatus according to claim 10, wherein said through hole is a single hole formed integrally in said first main discharge electrode, extending in a longitudinal direction thereof.

13. The gas laser oscillator apparatus according to claim 10, wherein said through hole is implemented by a plurality of holes lined up in a longitudinal direction of said first main discharge electrode.

14. A gas laser oscillator apparatus comprising:

a first main discharge electrode and a second main discharge electrode positioned to face with each other;

a pair of preliminary ionization electrodes that are comprised of hollow dielectric pipes; rear electrodes placed in hollow interiors of said dielectric pipes; and corona electrodes positioned so as to be in contact with outer surfaces of said dielectric pipes, and that are positioned at sides of said first main discharge electrode, among said first and second main discharge electrodes, so as to sandwich said first main discharge electrode therebetween, leaving prescribed gaps between said first main discharge electrode and themselves, respectively; and a support plate for securing and supporting said first main discharge electrode and said pair of preliminary ionization electrodes, in which laser gas is made to flow from a side of one of said preliminary ionization electrodes toward a side of other of said preliminary ionization electrodes through a main discharge space between said first and second main discharge electrodes, wherein the improvement comprises:

said corona electrodes are made of elastic bodies and conductors having a height lower than said first main discharge electrode are disposed in gaps between said first main discharge electrode and said preliminary ionization electrodes on an upper surface of said support plate, for reducing an eddy of the laser gas in said gaps; and said corona electrodes are disposed relative to said dielectric pipes in a configuration wherein said dielectric pipes press against said conductors, so as to sandwich said dielectric pipes, respectively, between said conductors and said elastic corona electrodes and to substantially uniformly preionize said main discharge space.

15. The gas laser oscillator apparatus according to claim 14, wherein the conductors and the corona electrodes are respectively area contacted with surfaces of the dielectric pipes in such a manner as to cover outer surfaces of sides of the dielectric pipes.

* * * * *